(12) United States Patent
Wang

(10) Patent No.: US 9,061,368 B2
(45) Date of Patent: Jun. 23, 2015

(54) LASER ANNEALING DEVICE

(75) Inventor: Yewen Wang, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 311 days.

(21) Appl. No.: 13/634,224

(22) PCT Filed: Jun. 5, 2012

(86) PCT No.: PCT/CN2012/076462
§ 371 (c)(1),
(2), (4) Date: Sep. 11, 2012

(87) PCT Pub. No.: WO2013/177806
PCT Pub. Date: Dec. 5, 2013

(65) Prior Publication Data
US 2013/0319977 A1    Dec. 5, 2013

(30) Foreign Application Priority Data

May 30, 2012    (CN) .......................... 2012 1 0174292

(51) Int. Cl.
*B23K 26/42*    (2006.01)
*B23K 26/00*    (2014.01)
*B23K 26/30*    (2014.01)
*B23K 26/06*    (2014.01)

(52) U.S. Cl.
CPC ........... *B23K 26/0042* (2013.01); *B23K 26/422* (2013.01); *B23K 26/0656* (2013.01)

(58) Field of Classification Search
CPC ......... B23K 26/00; B23K 26/42; H01L 21/00
USPC ......................................... 219/121.6–121.86
See application file for complete search history.

(56) References Cited

U.S. PATENT DOCUMENTS

| | | | | |
|---|---|---|---|---|
| 6,087,277 | A  * | 7/2000 | Shih et al. ...................... | 438/795 |
| 6,680,460 | B1 * | 1/2004 | Takaoka et al. ........... | 219/121.73 |
| 2009/0004759 | A1 * | 1/2009 | Ahn et al. ......................... | 438/3 |
| 2010/0045953 | A1 * | 2/2010 | Lee et al. ......................... | 355/67 |

* cited by examiner

*Primary Examiner* — Samuel M Heinrich
(74) *Attorney, Agent, or Firm* — Cheng-Ju Chiang

(57) ABSTRACT

The present invention relates to an improved laser annealing device, which includes a laser beam, a housing, a laser beam output window formed in a top of the housing, a substrate located at a bottom of the housing for carrying a material to be annealed, and a movable mask arranged between the laser beam output window and the substrate. The mask is set in inclination with respect to a horizontal direction. The mask forms a slit extending through upper and lower surfaces thereof. The laser beam travels vertically down through the laser beam output window and then passes through the slit to irradiate the substrate. The improved laser annealing device of the present invention includes a mask set in inclination with respect to the horizontal direction to prevent scraps from affecting the laser head, reduce replacement of the laser head, and lower down the cost.

11 Claims, 2 Drawing Sheets

LASER ANNEALING DEVICE

BACKGROUND OF THE INVENTION

1. Field of the Invention

The present invention relates to annealing techniques, and in particular to an improved laser annealing device.

2. The Related Arts

Annealing is a commonly used heat treatment process of metals, which gradually heats the metal to a predetermined temperature, which is then maintained for a sufficient period of time and then cooled with an appropriate speed. The purposes of annealing is to reduce hardness, improve machinability, release residual stress, stabilize size, suppress the tendency of deformation and cracking, refine grains, adjust organization, and remove organization defects.

Annealing is also used in the semiconductor technology. For example, a semiconductor chip must be subjected to annealing after injection of ions. This because in injecting impurity ions into a semiconductor, the injected ions that are of high energy impinge the atoms on the crystal lattice of the semiconductor, causing displacement of some lattice atoms. Consequently, a great number of voids are formed, disordering atom arrangements in the injection area or converting it into a non-crystal zone. Thus, after the injection of ions, the semiconductor must be annealed at a predetermined temperature to restore the crystal structure and remove the defects. Further, annealing also provides the functions of activating donor and acceptor impurities, namely causing some impurity atoms that are located at gaps into substitution positions through annealing. The temperature of annealing is generally 200-800° C., which is much lower than the temperature for thermal diffusion doping. Annealing is also carried out after evaporation of electrode metals in order to have the surface of the semiconductor bonded with the metal to form an alloy for forming good contact (reducing contact resistance). Under this condition, the annealing temperature is selected to be slightly higher than metal-semiconductor eutectic point.

Laser annealing is a new technique of semiconductor processing and provides a much better result than the regular thermal annealing. After laser annealing, the impurity substitution rate may get as high as 98-99%, making the resistivity of poly-silicon lowered to around ½-⅓ of the regular thermal annealing and also highly improving integration of an integrated circuit to reduce the spacing between circuit components to 0.5 microns. Laser annealing is generally carried out with two methods. The first method uses a continuous laser, such as argon ion laser, which applies a focused light beam to the semiconductor material. The crystallization process of the semiconductor material is that it is melted first and then the semiconductor gets gradually solidified due to the slope energy distribution and movement of the beam. The second method uses pulse oscillation laser, such as excimer laser. The crystallization process of the semiconductor is that the semiconductor is instantaneously melted by the high energy laser pulse and gets solidified.

The laser head for laser annealing is relatively expensive and replacing is time-consuming and may thus affect the manufacturing operation. Heretofore, most of the laser heads for annealing purposes are provided with certain protection means. U.S. Pat. No. 6,087,277 provides a laser annealing device with protection means. Referring to FIG. 1, a schematic view showing a conventional laser annealing device with protection means is given. The laser annealing device comprises top and bottom casings (not shown). The top forms a transparent output window 10 for laser beam. A laser beam 30 travels vertically through the laser beam output window 10 to carry out annealing on a metal layer formed on a substrate 20 located at the bottom. Usually, the laser beam 30 is caused to make a scanning movement on the substrate 20. The irradiation of the high energy laser beam 30 on the material of the substrate 20 to be annealed may easily cause outward spreading of scraps 40. The direction of spreading of the scraps 40 are indicated by arrows of FIG. 1. After long operation of the annealing device, the scraps 40 gets accumulated on the undersurface of the laser beam output window 10, making it not transparent and thus affecting the transmission of the laser beam. It is thus required that the laser beam output window 10 be frequently replaced and this increases the cost. To protect the laser head, the laser annealing device disclosed in U.S. Pat. No. 6,087,277 provides a mask 50 that is located between the laser beam output window 10 and the substrate 20 and is movable in synchronization with the laser beam 30 to prevent the scraps 40 from affecting and contaminating the laser head. The mask 50 is set horizontally and forms in a center thereof a slit 60. The laser beam 30 that travels down vertically passes through the laser beam output window 10 and then the slit 60 before it irradiates the substrate 20. Thus, the mask 50 prevents the scraps 40 to get accumulated on the laser beam output window 10 and allows the period of replacement of the laser beam output window 10 to be extended. Yet, further improvement can be made on the known laser annealing device to reduce the accumulation of scraps and lower down the number of replacing the laser head.

SUMMARY OF THE INVENTION

Thus, an object of the present invention is to provide an improved laser annealing device that reduces the accumulation of scraps.

To achieve the object, the present invention provides an improved laser annealing device, which comprises a laser beam, a housing, a laser beam output window formed in a top of the housing, a substrate located at a bottom of the housing for carrying a material to be annealed, and a movable mask arranged between the laser beam output window and the substrate. The mask is set in inclination with respect to a horizontal direction. The mask forms a slit extending through upper and lower surfaces thereof. The laser beam travels vertically down through the laser beam output window and then passes through the slit to irradiate the substrate.

Wherein, the slit has a size that is just sufficient for the laser beam to travel vertically down therethrough.

Wherein, the mask is set at 45 degrees with respect to the horizontal direction.

Wherein, the mask is made of quartz.

Wherein, the mask is made of soda-lime glass.

Wherein, the slit has length and width that are both between 0.1-30 mm.

Wherein, the distance between the mask and the laser beam output window is 0.1-200 mm.

Wherein, the distance between the mask and the substrate is 0.1-200 mm.

Wherein, the material to be annealed comprises nano indium tin oxides.

Wherein, the laser beam is an excimer laser beam.

The present invention provides an improved laser annealing device that comprises a mask set in inclination with respect to the horizontal direction to prevent scraps from affecting the laser head, reduce replacement of the laser head, and lower down the cost.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
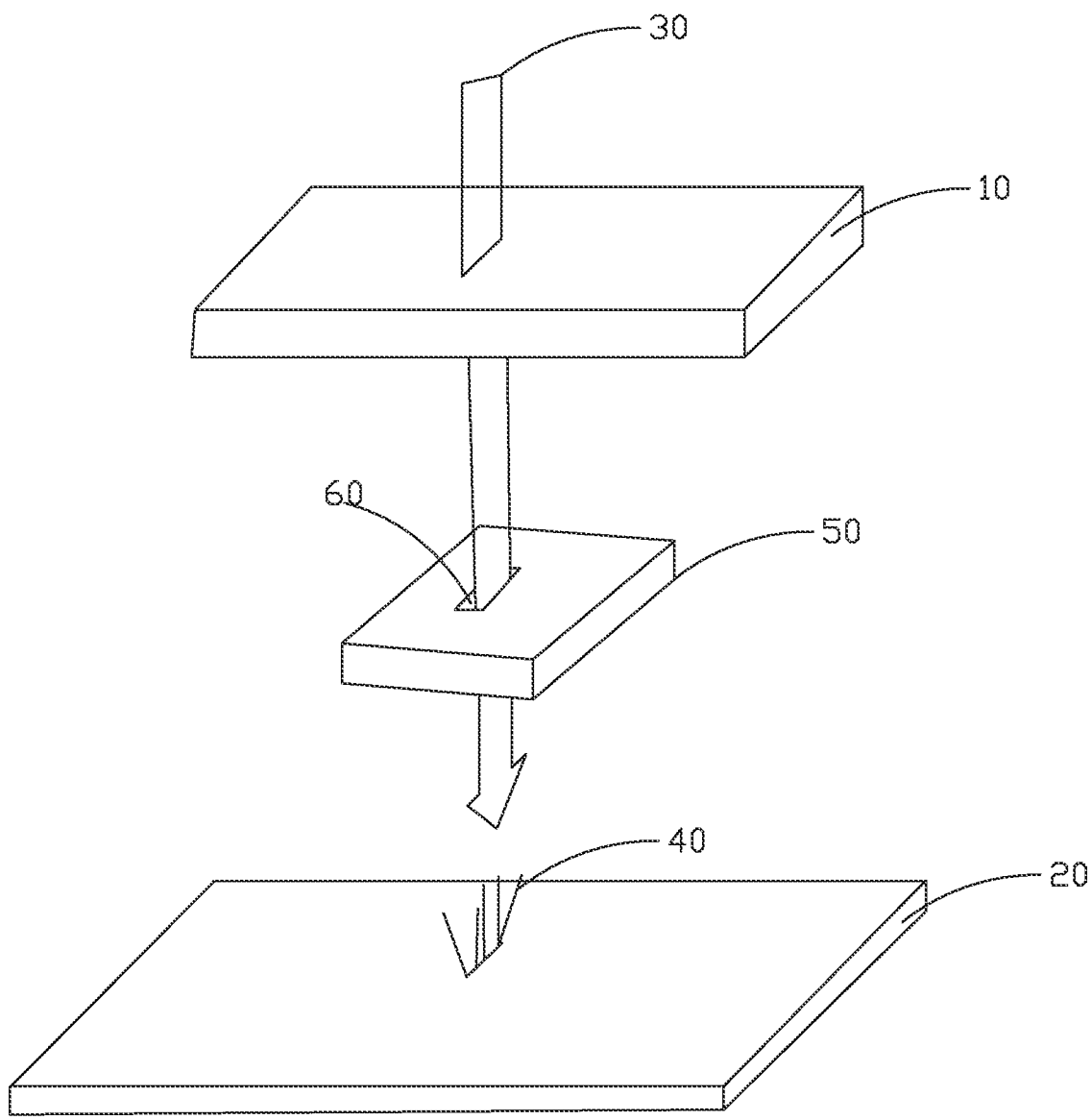
FIG. 1 is a schematic view showing a conventional laser annealing device with protection means.
Figure 2:
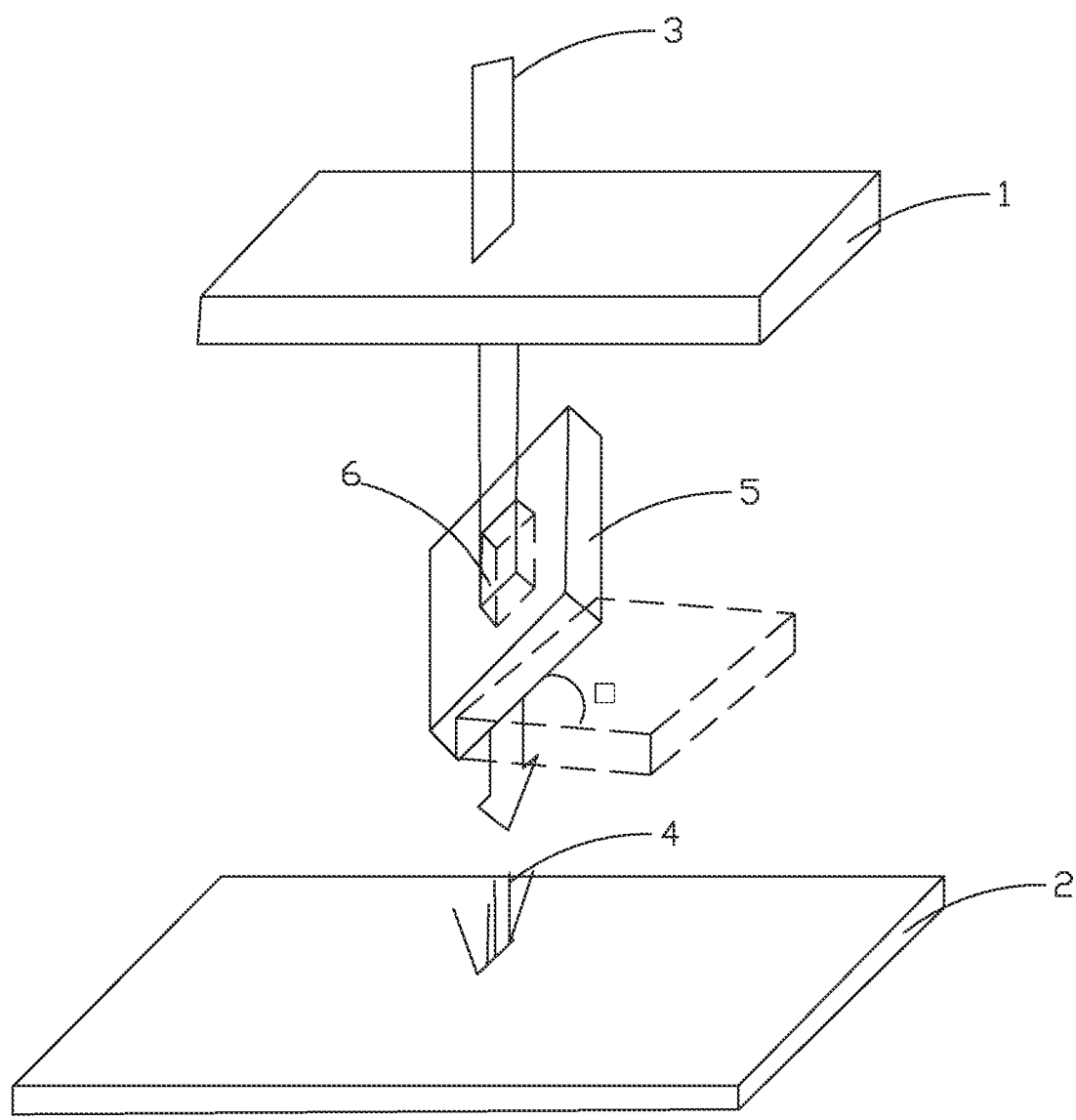
FIG. 2 is a schematic view showing a preferred embodiment of an improved laser annealing device according to the present invention.

Referring to FIG. 2, which is a schematic view showing a preferred embodiment of an improved laser annealing device according to the present invention, the improved laser annealing device according to the present invention comprise a laser beam 3, a housing (not shown), a laser beam output window 1 formed in a top of the housing, a substrate 2 located at a bottom of the housing for carrying a material to be annealed, and a movable mask 5 arranged between the laser beam output window 1 and the substrate 2. The mask 5 is set in an inclined manner with an inclination angle θ with respect to the horizontal direction and is, in the preferred embodiment, set at 45° with respect to both horizon and vertical to, on the one hand, protect the laser hand and, on the other hand, deflect any splashed scraps 4. The mask 5 forms a slit 6 extending through upper and lower surfaces thereof. The laser beam 3 travels vertically down through the laser beam output window 1 and then passes through the slit 6 to irradiate the substrate 2. The splashing directions of the scraps 4 are indicated by arrows in FIG. 2. The improved laser annealing device according to the present invention does not cause accumulation of a large amount of scraps 4 on an undersurface of the laser beam output window 1 to make it not transparent after a long time of operation. It can be appreciated by those having ordinary skills in the art that the laser beam 3 is often operated to carry out annealing by scanning through the substrate 2. Thus, the mask 5 must be kept fixed with respect to the laser beam. To carry out the operation through scanning, the improved laser annealing device comprises a motion device that causes the laser beam 3 to take a scanning operation on the substrate 2 and keeps the mask 5 fixed with respect to the laser beam. To keep an inert atmosphere on the substrate 2 during the annealing process, the housing must be hermetic. To provide the best performance of deflecting the scraps 4 by the mask 5, the size of the slit 6 can be just sufficient for the laser beam 3 to travel vertically down therethrough. The mask 5 can be made of quartz or soda-lime glass and is set at 45 degrees with respect to the horizontal direction.

The improved laser annealing device is preferably applied to a liquid crystal panel with the material to be annealed being nano indium tin oxides. In such an application, the length and width of the slit 6 may both be 0.1-30 mm. The distance between the mask 5 and the laser beam output window 1 is 0.1-200 mm. The distance between the mask 5 and the substrate 2 is 0.1-200 mm. The laser beam 3 can be excimer laser beam.

In summary, the present invention provides an improved laser annealing device that comprises a mask set in an inclination of 45° with respect to the horizontal direction to prevent scraps from affecting the laser head, reduce replacement of the laser head, and lower down the cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An improved laser annealing device, comprising a laser beam, a housing, a laser beam output window formed in a top of the housing, a substrate located at a bottom of the housing for carrying a material to be annealed, and a movable mask arranged between the laser beam output window and the substrate, the mask being set in inclination with respect to a horizontal direction in such a way as to face the material to be annealed for receiving and deflecting a scrap splashing from the material to be annealed, the mask forming a slit extending through upper and lower surfaces thereof, the laser beam traveling vertically down through the laser beam output window and then passing through the slit to irradiate the substrate.

2. The improved laser annealing device as claimed in claim 1, wherein the slit has a size that is just sufficient for the laser beam to travel vertically down therethrough.

3. The improved laser annealing device as claimed in claim 1, wherein the mask is set at 45 degrees with respect to the horizontal direction.

4. The improved laser annealing device as claimed in claim 1, wherein the mask is made of quartz.

5. The improved laser annealing device as claimed in claim 1, wherein the mask is made of soda-lime glass.

6. The improved laser annealing device as claimed in claim 1, wherein the slit has length and width that are both between 0.1-30 mm.

7. The improved laser annealing device as claimed in claim 1, wherein a distance between the mask and the laser beam output window is 0.1-200 mm.

8. The improved laser annealing device as claimed in claim 1, wherein a distance between the mask and the substrate is 0.1-200 mm.

9. The improved laser annealing device as claimed in claim 1, wherein the material to be annealed comprises nano indium tin oxides.

10. The improved laser annealing device as claimed in claim 1, wherein the laser beam is an excimer laser beam.

11. An improved laser annealing device, comprising a laser beam, a housing, a laser beam output window formed in a top of the housing, a substrate located at a bottom of the housing for carrying a material to be annealed, and a movable mask arranged between the laser beam output window and the substrate, the mask being set in inclination with respect to a horizontal direction in such a way as to face the material to be annealed for receiving and deflecting a scrap splashing from the material to be annealed, the mask forming a slit extending through upper and lower surfaces thereof, the laser beam traveling vertically down through the laser beam output window and then passing through the slit to irradiate the substrate;

wherein the slit has a size that is just sufficient for the laser beam to travel vertically down therethrough;
wherein the mask is set at 45 degrees with respect to the horizontal direction;
wherein the mask is made of quartz;
wherein the slit has length and width that are both between 0.1-30 mm;
wherein distance between the mask and the laser beam output window is 0.1-200 mm;
wherein distance between the mask and the substrate is 0.1-200 mm;
wherein the material to be annealed comprises nano indium tin oxides; and
wherein the laser beam is an excimer laser beam.

* * * * *